United States Patent
Takatori

(10) Patent No.: US 11,809,073 B2
(45) Date of Patent: Nov. 7, 2023

(54) APPARATUS, CONTROL METHOD, AND STORAGE MEDIUM

(71) Applicant: CANON KABUSHIKI KAISHA, Tokyo (JP)

(72) Inventor: Tatsuo Takatori, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 312 days.

(21) Appl. No.: 17/362,564

(22) Filed: Jun. 29, 2021

(65) Prior Publication Data
US 2022/0004082 A1     Jan. 6, 2022

(30) Foreign Application Priority Data

Jul. 3, 2020    (JP) ................................. 2020-115380

(51) Int. Cl.
| | |
|---|---|
| H04N 23/73 | (2023.01) |
| G03B 7/099 | (2021.01) |
| G03B 11/00 | (2021.01) |
| G03B 9/02 | (2021.01) |

(52) U.S. Cl.
CPC ............... *G03B 7/099* (2013.01); *G03B 9/02* (2013.01); *G03B 11/00* (2013.01); *H04N 23/73* (2023.01)

(58) Field of Classification Search
None
See application file for complete search history.

(56) References Cited

U.S. PATENT DOCUMENTS

| | | | |
|---|---|---|---|
| 2020/0213512 A1* | 7/2020 | Yasutomi | ............. H04N 23/951 |
| 2020/0213546 A1* | 7/2020 | Hasegawa | ............. G03B 7/095 |
| 2021/0168278 A1* | 6/2021 | Takanashi | ............ H04N 23/672 |
| 2021/0258475 A1* | 8/2021 | Ota | ...................... H04N 23/633 |

FOREIGN PATENT DOCUMENTS

WO     2016031867 A1    3/2016

* cited by examiner

*Primary Examiner* — Clayton E. LaBalle
*Assistant Examiner* — Diana Hancock
(74) *Attorney, Agent, or Firm* — CANON U.S.A., INC. IP Division

(57) ABSTRACT

An apparatus includes a control unit configured to control an aperture diameter of a diaphragm based on a result of photometry, a determination unit that, in a case where t light flux enters the imaging unit via a predetermined optical member which has light transmitted in quantities varying stepwise in a radial direction with respect to and optical axis, determine whether there exists a plurality of F numbers that indicates the aperture diameter of the diaphragm at which approximately identical quantities of light enter the imaging unit. In a case where the determination unit determines that there exists a plurality of F numbers at which approximately identical quantities of light enter the imaging unit, the control unit controls the F number to be differently set in accordance with information regarding an image capturing condition.

19 Claims, 6 Drawing Sheets

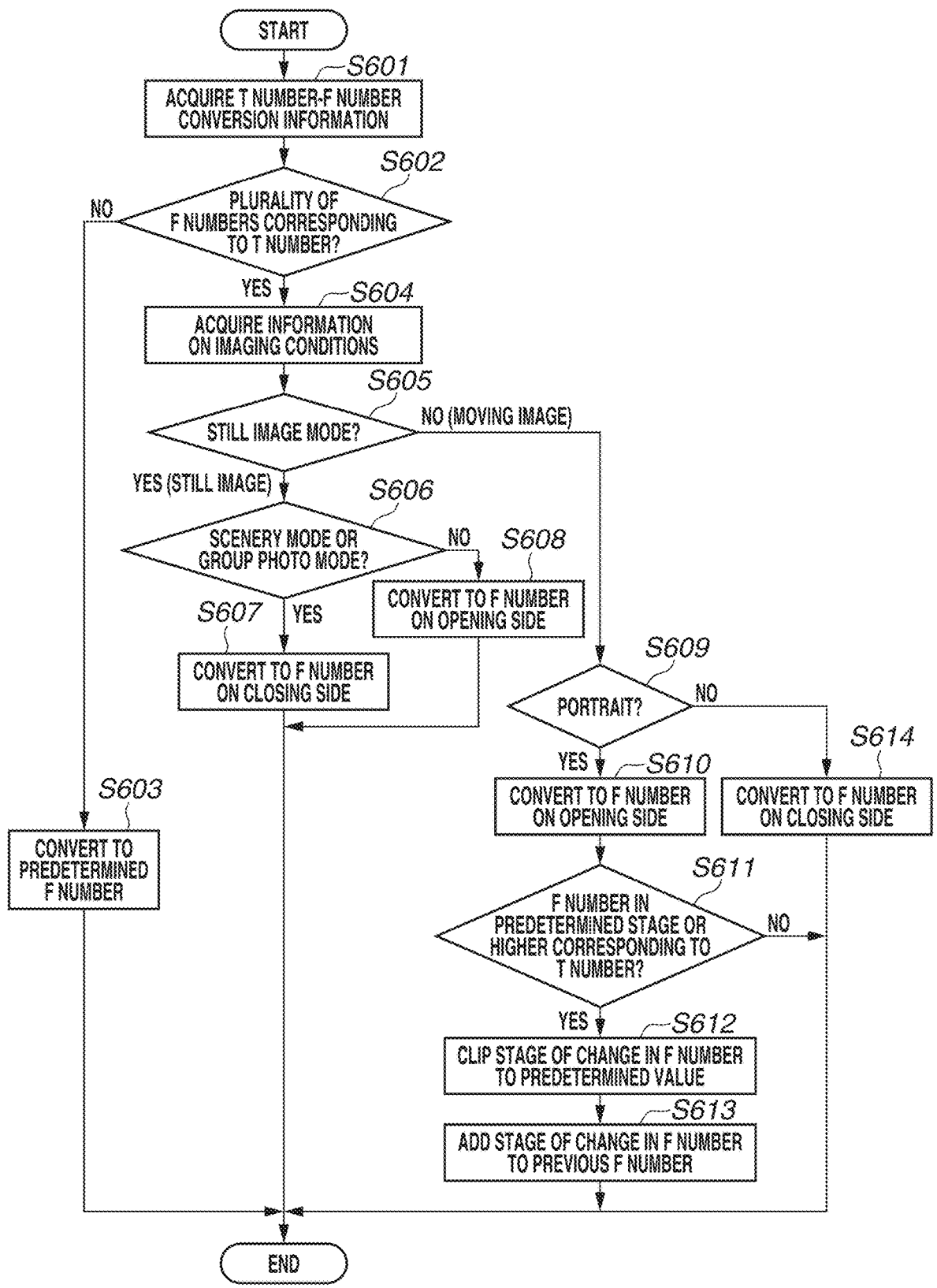

APPARATUS, CONTROL METHOD, AND STORAGE MEDIUM

BACKGROUND OF THE DISCLOSURE

Field of the Disclosure

The aspect of the embodiments relates to an apparatus, a method for the same, and a storage medium, and more particularly, to exposure control for imaging a subject via an optical member through which light is transmitted in quantities changed stepwise in a radial direction with respect to an optical axis.

Description of the Related Art

There is a known technique for imaging a subject using a specific optical filter to improve a blurred image of the subject. An example of the optical filter is an apodization filter (hereinafter, simply called APD filter).

The APD filter is a filter changed in light transmittance with decreasing proximity to an optical axis from an optical axis center in a direction orthogonal to the optical axis. The use of the APD filter allows the outline of a blur in an image to be smoothly expressed, for example, thereby to suppress the generation of a blurred image not intended by a user, such as double-line blur and ring blur. In particular, in scenes where a shallow depth of field is desired such as in portrait photography or macro photography, the use of the APD filter is useful in obtaining a high-quality image where the outline of a background is softly blurred and the main subject is in-focus and stands out against the background.

As described above, the APD filter varies in light transmittance depending on the distance from the optical axis, and thus the quantity of light flux entering via the APD filter and passing through the diaphragm varies non-linearly in accordance with change in the aperture diameter of the diaphragm. Especially, in the APD filter the light transmittance of which becomes lower with decreasing proximity to the optical axis, the quantity of light near opening state of aperture diameter changes more slowly than the quantity of light with the aperture stopped down. That is, even with the identical aperture value (F number) set in the imaging apparatus, an image obtained with the APD filter may be different in brightness from an image obtained without the APD filter.

WO 16/031867 discusses that, if a lens with an APD filter is connected to an imaging apparatus, exposure control is performed using a program line for exposure control based on a T number, which is an index for brightness with consideration given to the aperture diameter of the diaphragm and the light transmittance of the lens.

SUMMARY OF THE DISCLOSURE

An apparatus that includes an imaging unit and is capable of controlling an aperture diameter of a diaphragm for adjusting quantity of light entering the imaging unit, includes at least one processor; and a memory coupled to the processor storing instructions that, when executed by the processor, cause the processor to function as: a photometry unit, a control unit configured to control a plurality of control values including the aperture diameter of the diaphragm, based on a result of photometry using the photometry unit, a first determination unit configured to determine whether light flux entering the imaging unit enters via a predetermined optical member, and a second determination unit configured to determine, in a case where the light flux enters the imaging unit via the predetermined optical member, whether there exists a plurality of F numbers that indicates the aperture diameter of the diaphragm at which approximately identical quantities of light enter the imaging unit, wherein the predetermined optical member has light transmitted in quantities varying stepwise in a radial direction with respect to an optical axis, and wherein, in a case where there exists a plurality of F numbers at which approximately identical quantities of light enter the imaging unit, the control unit controls the F number to be differently set in accordance with information regarding a condition.

Further features of the disclosure will become apparent from the following description of exemplary embodiments with reference to the attached drawings.

BRIEF DESCRIPTION OF THE DRAWINGS

FIG. 6 is a flowchart of a T number-to-F number conversion process according to the exemplary embodiment of the disclosure.

DESCRIPTION OF THE EMBODIMENTS (Basic Configuration of an Imaging Apparatus)

Figure 1:
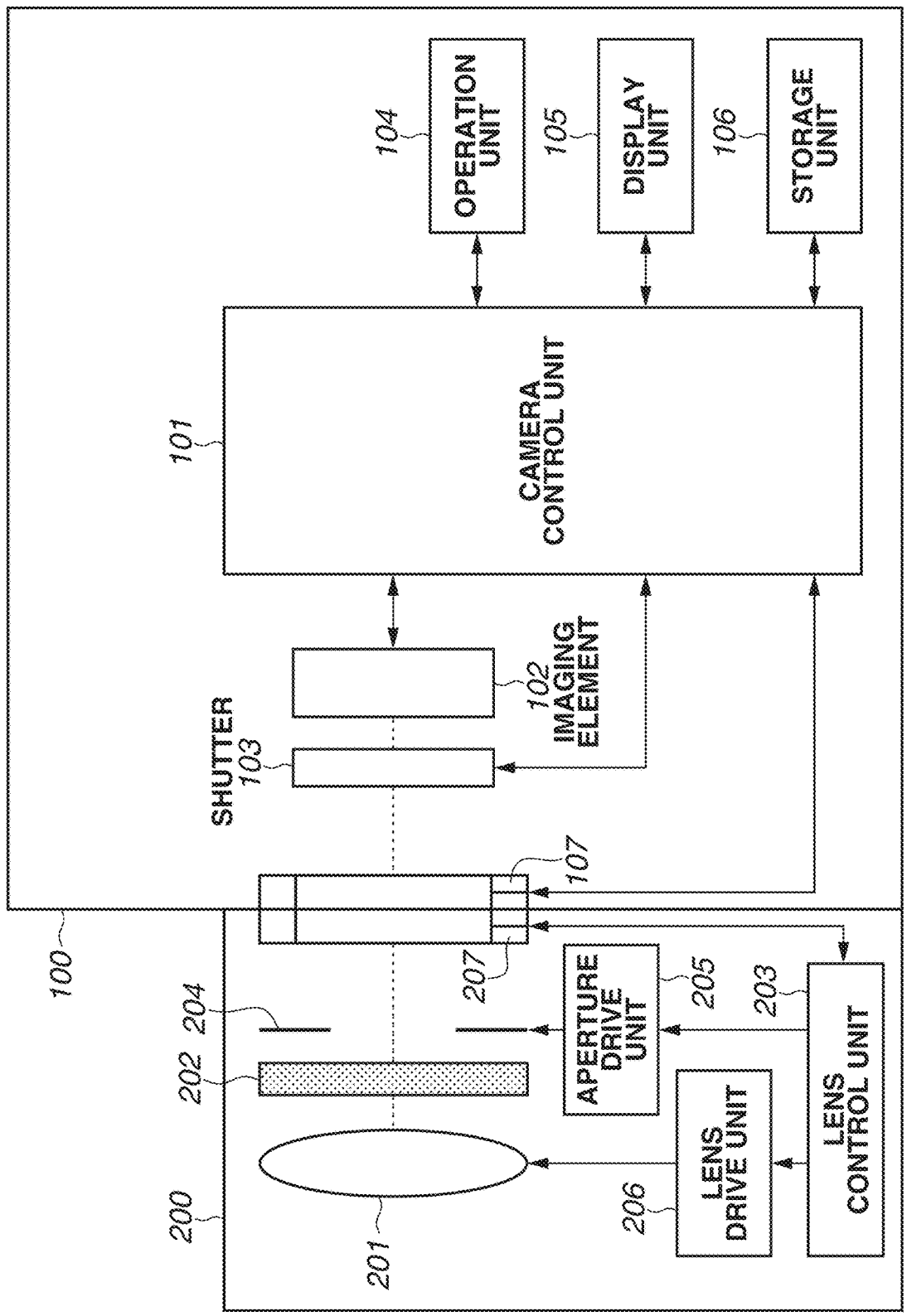
FIG. 1 is a block diagram illustrating a configuration of a camera main body and a lens unit in an exemplary embodiment of an imaging apparatus in which the disclosure is implemented.

Hereinafter, an exemplary embodiment of the disclosure will be described with reference to the attached drawings. FIG. 1 is a block diagram illustrating a configuration of a camera main body 100 and a lens unit 200 in the exemplary embodiment of an imaging apparatus in which the disclosure is implemented. One or more of functional blocks illustrated in FIG. 1 may be implemented by hardware such as an application specific integrated circuit (ASIC) or programmable logic array (PLA). Alternatively, the functional blocks may be implemented through execution of software by a programmable processor (microprocessor or microcomputer) such as a central processing unit (CPU) or a micro processing unit (MPU). Otherwise, the functional blocks may be implemented by a combination of software and hardware. Therefore, even if it is described below that some operations are performed by different functional blocks, the same hardware actually may perform the operations.

The lens unit 200 is an accessory detachably attached to the camera main body 100, which is an exchangeable lens including a lens group 201 of focus lens, zoom lens, shift lens, and the like.

Figure 2:
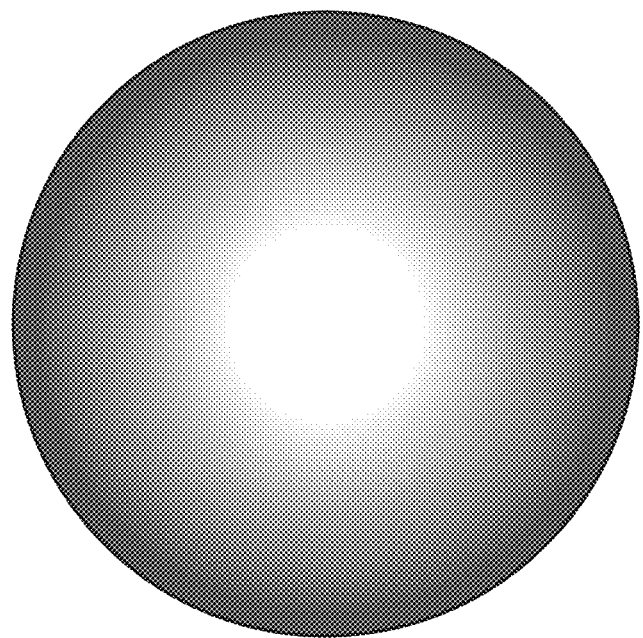
FIG. 2 is a diagram exemplarily illustrating the light transmittance of an APD filter according to an exemplary embodiment of the disclosure.

An apodization filter (hereinafter, abbreviated as APD filter) 202 is an optical filter that is disposed on a light path between the lens group 201 and an imaging element 102 of the camera main body 100. FIG. 2 is a diagram exemplarily illustrating the light transmittance of the APD filter 202 according to the exemplary embodiment of the disclosure.

The APD filter 202 has light transmittance (in other words, filter density) varying stepwise in the radial direction of the APD filter 202 orthogonal to an axis (optical axis) positioned in the center of the APD filter 202. Specifically, the light transmittance of the APD filter 202 becomes gradually lower and the density of the APD filter 202 becomes gradually higher toward the outside in the radial direction of the filter with respect to the optical axis. Therefore, the quantity of light flux entering and transmitted via the APD filter 202 varies in the radial direction with respect to the optical axis.

Based on light transmittance Tr of the APD filter 202 and the aperture value (F number) related to the aperture diameter of a diaphragm 204 described below, the T number indicating the entire light quantity in the lens unit 200 based on the aperture diameter of the diaphragm 204 and the light transmittance of the lens unit 200 is expressed by the following equation (1):

$$T=F/Tr^{1/2} \quad (1)$$

The light transmittance Tr in the equation (1) takes a mean value in the entire area of the aperture (light flux transmission aperture) formed by the diaphragm 204.

Figure 3:
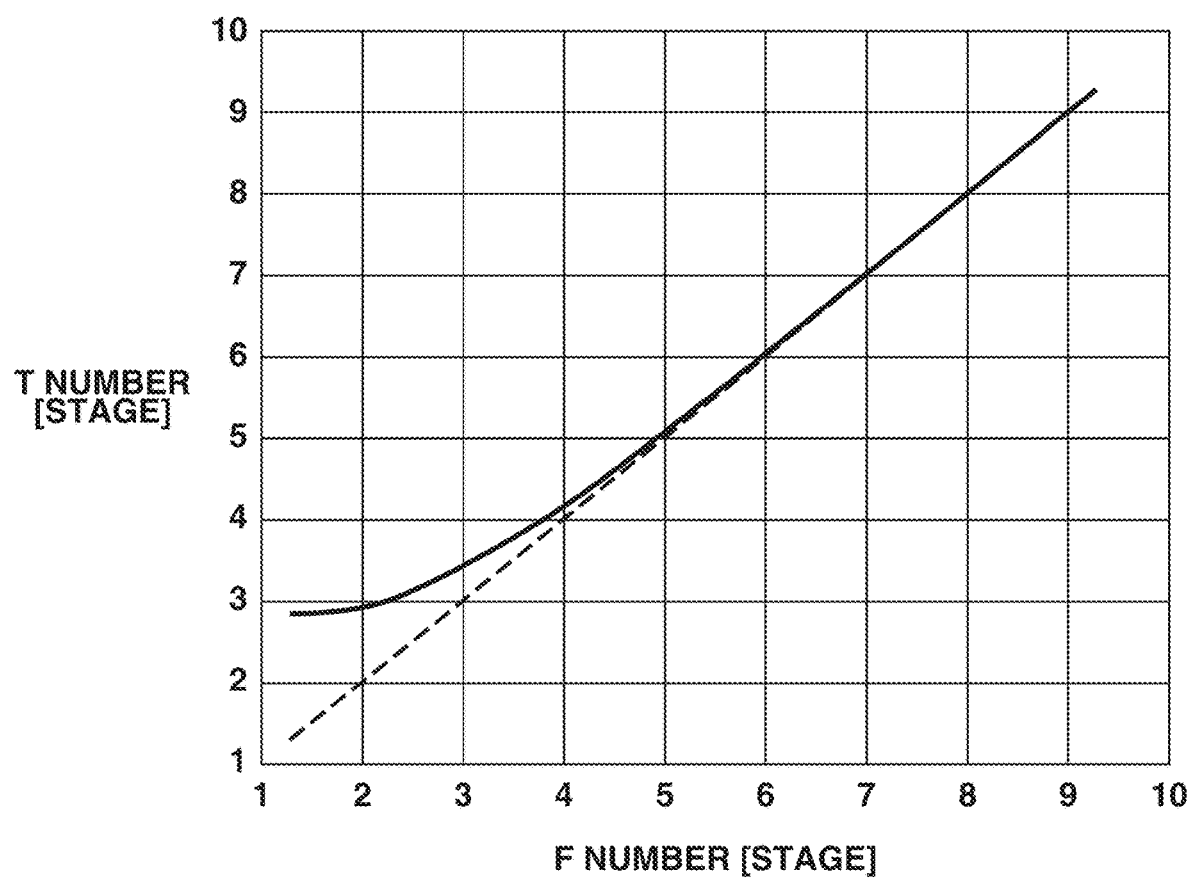
FIG. 3 is a diagram exemplarily describing the correspondence between F number and T number in the lens unit according to the exemplary embodiment of the disclosure.

FIG. 3 is a diagram exemplarily illustrating the correspondence between F number and T number in the lens unit 200 according to the exemplary embodiment of the disclosure, where the horizontal axis indicates F number and the vertical axis indicates T number. Referring to FIG. 3, if the F number and the T number coincide with each other as in the case of a lens unit not including the APD filter 202, for example, the T number changes linearly with respect to the F number as illustrated by a dotted line in FIG. 3.

In the present exemplary embodiment, a change in brightness corresponding to one stage of light quantity is a change in brightness corresponding to 1 brightness value (Bv) in an additive system of photographic exposure (APEX). In general, when the aperture diameter (effective diameter) of the diaphragm changes $1/\sqrt{2}$ times, the F number changes by one stage and the light quantity (Bv) also changes by one stage. However, if the filter density of an area near opening state of the diaphragm 204 is higher (light transmittance is lower) than the filter density in other areas as in the APD filter 202 of the present exemplary embodiment, a difference is generated between the F number and the T number near opening state of the diaphragm 204. This is because, in the area of the APD filter 202 near opening state of the diaphragm 204, even if the F number changes by one stage, the quantity of light transmitted through the APD filter 202 is less than 1 Bv. A change in brightness corresponding to one stage of the F number is synonymous with a change in brightness corresponding to 1 Bv in a lens unit not including the APD filter 202.

As illustrated in FIG. 3, in the correspondence between the T number and the F number in the lens unit 200 indicated with a solid line, as the diaphragm 204 is stopped down, the difference between the T number and the F number becomes smaller, and when the F number exceeds a predetermined value (five stages (5 Bv) in FIG. 3, the T number and the F number approximately coincide with each other. In contrast, as the aperture diameter of the diaphragm 204 is made larger (the diaphragm 204 is shifted to the opening side), the difference between the T number and the F number becomes larger, and the dimming effect of the APD filter 202 becomes greatest near the opening state of the diaphragm 204, for example. Specifically, in the lens unit 200 of the present exemplary embodiment, the quantity of light transmitted through the APD filter 202 decreases by about 1.5 stages near opening state of the diaphragm 204, with respect to a lens unit not including the APD filter 202.

Returning to FIG. 1, the lens unit 200 has a lens control unit 203 that controls the units included in the lens unit 200. For example, the lens control unit 203 can control driving of the diaphragm 204 via a diaphragm drive unit 205. The lens control unit 203 can also control driving of the lens group 201 via a lens drive unit 206. The lens control unit 203 is connected to a camera control unit 101 of the camera main body 100 via a terminal group described below and can control the lens unit 200 under a control instruction from the camera control unit 101.

A second terminal group 207 is a terminal group that is used for electrical connection between the lens unit 200 and the camera main body 100, and includes, for example, a terminal for power supply from the camera main body 100 to the lens unit 200 and a communication terminal for exchanging communication data. With the lens unit 200 attached to the camera main body 100, the second terminal group 207 is electrically connected to a first terminal group 107 included in the camera main body 100. Accordingly, when being attached to the camera main body 100, the lens unit 200 can communicate with the camera main body 100 via the first terminal group 107 and the second terminal group 207.

Next, the components of the camera main body 100 will be described with reference to FIG. 1. The camera control unit 101 is a control unit including an arithmetic unit such as a CPU and can collectively control the camera main body 100 and accessories attached to the camera main body 100. A read only memory (ROM) and a random access memory (RAM) are connected to the camera control unit 101. The ROM (not illustrated) is a non-volatile recording element and has programs for operating the camera control unit 101 and various adjustment parameters recorded therein. A program read from the ROM is loaded and executed in the volatile RAM (not illustrated). In general, the RAM is a lower-speed and lower-capacity element than a frame memory (not illustrated).

The camera main body 100 includes a frame memory (not illustrated) and serves as a storage unit that temporarily saves signals (video signals) and read them as necessary. In general, the frame memory is called RAM, and in recent years a dual data rate 3-synchronous dynamic RAM (DDR3-SDRAM) has been frequently used as frame memory. The use of this frame memory enables various processes.

The imaging element 102 is an imaging unit that uses a charge-accumulating solid state imaging element such as a complementary metal-oxide semiconductor (CMOS) or a charge-coupled device (CCD), which is capable of receiving light flux guided from a subject into the camera main body 100 via the lens unit 200 and converting the light flux to an electrical image signal. The electrical signal obtained by the imaging element 102 takes an analog value, and thus the imaging element 102 also has the function of converting an analog value to a digital value. Based on the image signal output from the imaging element 102, it is possible to detect an evaluation value (photometric value) of brightness of the subject.

A shutter 103 is a light shielding member disposed on a light path between the lens unit 200 and the imaging element 102 in a state where the lens unit 200 is attached to the camera main body 100. The quantity of light entering the imaging element 102 can be adjusted by controlling the state of the shutter 103. During live view display in which the image signals obtained by imaging the subject are displayed in succession on a display unit 105, the shutter 103 is in the opening state so as not to shield the imaging element 102 from light.

An operation unit 104 is an operation input unit in the camera main body 100 and serves as a user interface. Thus, the operation unit 104 is formed of elements such as mechanical buttons and switches that include a power switch, a mode changeover switch, an operation input switch, and the like. In recent years, resistive thin-film elements called touch panel or capacitance thin-film elements have also been used. That is, if the display unit 105 is a touch panel-type display device, the display unit 105 can serve also as the operation unit 104. In order to drive these systems, the camera main body 100 also includes a power supply unit (not illustrated) and an oscillation unit (not illustrated). The power supply unit is a unit that supplies power to each block of the camera main body 100 and has the function of converting power from an external commercial power source or battery to an arbitrary voltage and distributing the same. The oscillation unit is an oscillation element called crystal. The camera control unit 101 generates a desired timing signal with respect to a single-cycle signal input from the oscillation element to proceed with a program sequence.

The display unit 105 is a display device the user can view to check the operation status of the camera main body 100. For example, the display unit 105 displays a video obtained by processing the image signals of the subject, setting menus, and the like. The display element of the display unit 105 is a liquid crystal display (LCD) in this configuration but may be an organic electroluminescence (EL) instead.

A storage unit 106 is capable of recording video signals (video data) and various setting data, and includes a large-capacity storage element. For example, the storage unit 106 is a hard disc drive (HDD) or a solid state drive (SSD), and may be detachably attached to the camera main body 100. The foregoing is an example of the camera system according to the present exemplary embodiment.

(Exposure Control Process)

Figure 4:
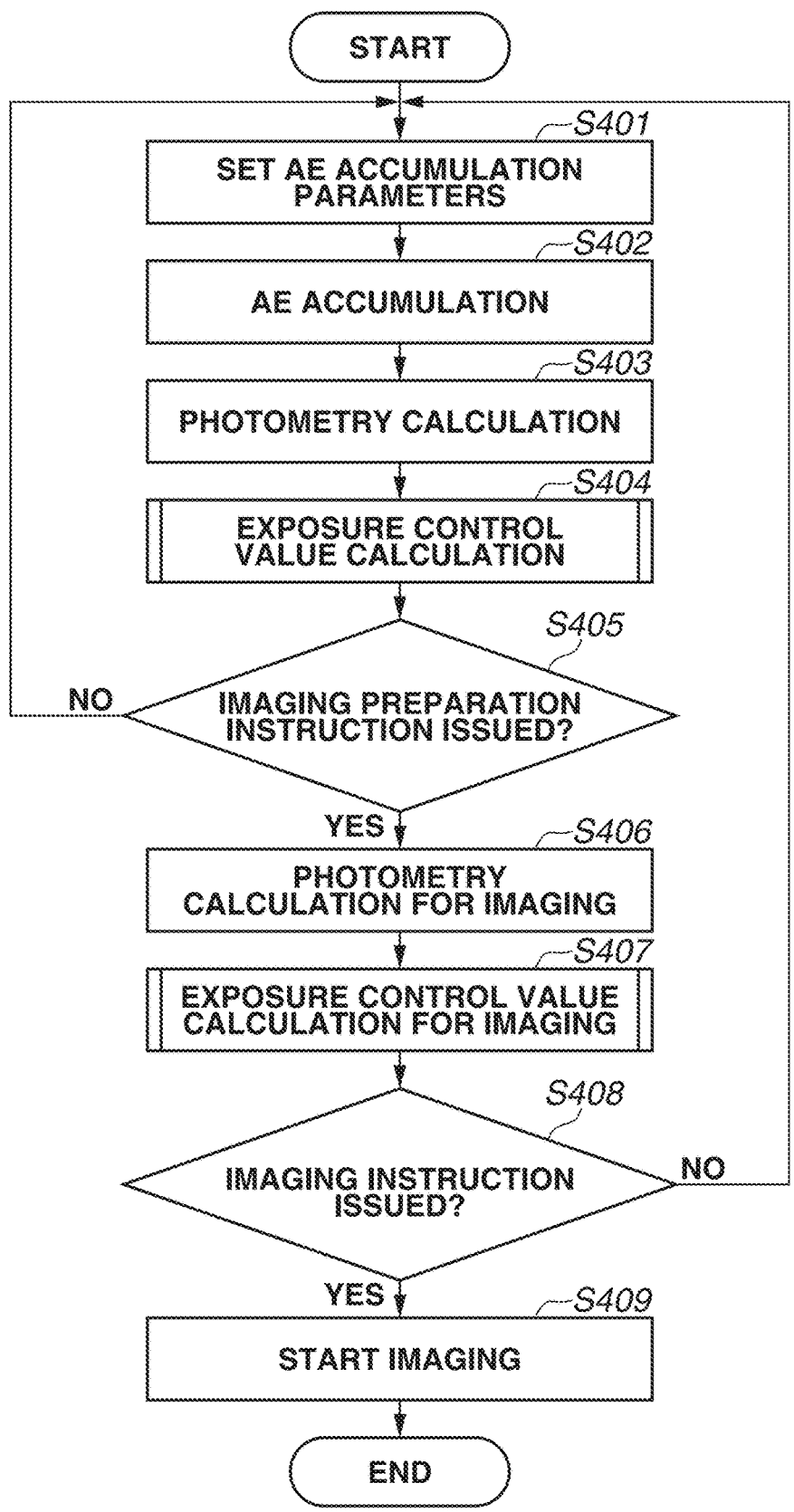
FIG. 4 is a flowchart of an exposure control process according to the exemplary embodiment of the disclosure.

Hereinafter, an exposure control process for imaging a subject according to the present exemplary embodiment will be described. FIG. 4 is a flowchart of the exposure control process according to the exemplary embodiment of the disclosure.

First, in step S401, the camera control unit 101 sets auto exposure (AE) accumulation parameters. The AE accumulation parameters include image size, accumulation time, image capturing sensitivity (gain), and the like, which mainly depend on the configuration of the imaging element 102. The set AE accumulation parameters are stored in the above-described RAM.

Next, in step S402, the camera control unit 101 drives the imaging element 102 to perform AE accumulation based on the AE accumulation parameters set in step S401. The AE accumulation in the present exemplary embodiment is a charge accumulation operation using the imaging element 102 for acquiring the evaluation value (photometric value) for exposure control. Exposure control values for the AE accumulation are predetermined values.

Next, in step S403, the camera control unit 101 acquires an evaluation value based on a mean value of the image signals obtained by the AE accumulation in step S402. Then, the camera control unit 101 determines representative brightness (photometric value) of the subject as a photometry result based on the acquired evaluation value. As a method for calculating the photometric value, the angle of view corresponding to the image signal is divided into a plurality of blocks, mean values of signals output from the pixels corresponding to the individual blocks are determined, and the mean values determined for the individual blocks are added up and averaged to determine the photometric value (representative brightness). For the unit of the photometric value, 1 Bv in an APEX is set as one stage of brightness in this configuration, but another unit may be used instead.

Next, in step S404, the camera control unit 101 determines the exposure control values based on the previously determined photometric value. The exposure control values according to the present exemplary embodiment are shutter speed (accumulation time), aperture value, and image capturing sensitivity, which are parameters for adjusting the brightness of the image obtained by imaging the subject. The determined exposure control values are stored in the above-described RAM.

Next, in step S405, the camera control unit 101 determines whether the user has issued an instruction for imaging preparation. In the present exemplary embodiment, the camera control unit 101 determines the presence or absence of an imaging preparation instruction by determining whether the release switch of the operation unit 104 is in a half-pressed state (hereinafter called SW1 state). Instead of the half-press of the release switch, a focus position adjustment or a photometry instruction may be regarded as an imaging preparation instruction.

The processing in steps S401 to S405 is executed by powering on the camera main body 100 and thereafter may be executed at predetermined time intervals (for example, every five seconds). According to this configuration, even during the live view display on the display unit 105, it is possible to regularly execute optimum exposure control on brightness of the subject. This prevents the live view display from becoming unnaturally bright while reducing power consumption.

If determining that the user has issued an imaging preparation instruction (YES in step S405), in step S406, the camera control unit 101 starts a photometry calculation for imaging and acquires a photometric value for imaging. The method for calculating the photometric value is approximately identical to that described above in step S403, and thus description thereof will be omitted here.

Next, in step S407, the camera control unit 101 calculates the exposure control values for imaging. The method for calculating the exposure control values for imaging is approximately identical to that described above in step S404, and thus description thereof will be omitted here. The calculated exposure control values for imaging are stored in the above-described RAM.

Figure 5:
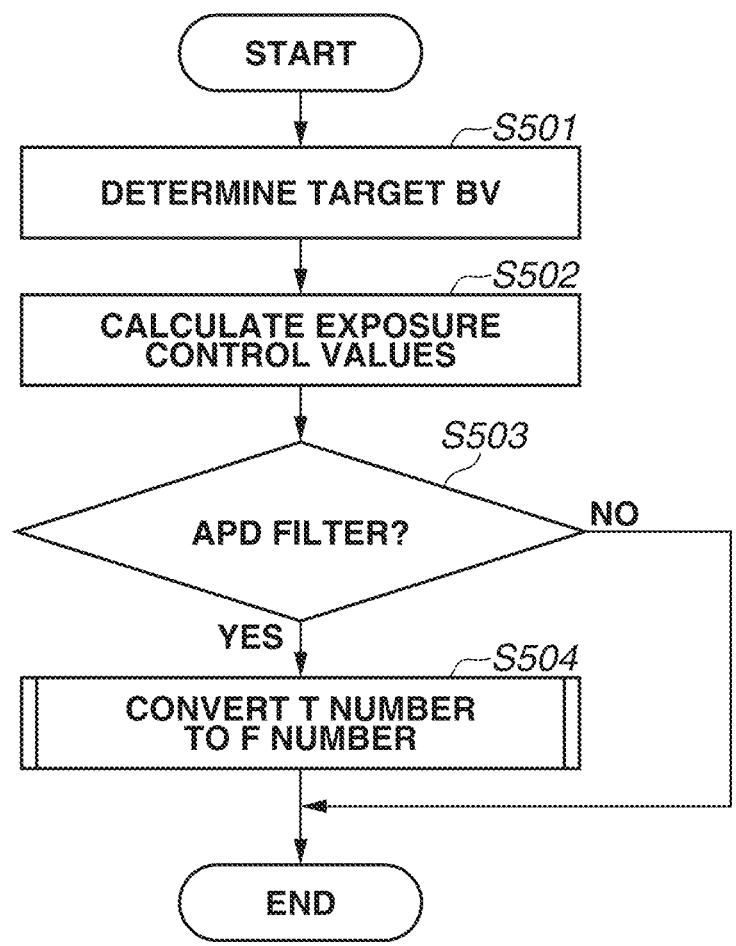
FIG. 5 is a flowchart of an exposure control value calculation process for imaging according to the exemplary embodiment of the disclosure.

The process for calculating the exposure control values executed in steps S404 and S407 will be described with reference to FIG. 5. FIG. 5 is a flowchart of the exposure control value calculation process for imaging according to the exemplary embodiment of the disclosure. First, in step S501, the camera control unit 101 determines a target By based on the photometric value (representative brightness) determined by the photometry calculation. The target By is determined based on the reference stored in advance in the camera main body 100. The determined target By is stored in the above-described RAM.

Next, in step S502, the camera control unit 101 determines the exposure control values in accordance with the target By determined in step S501, using a program line stored in advance in the storage unit 106. The program line for the exposure control according to the present exemplary embodiment is used to determine a set of exposure control values in accordance with the image capturing conditions. As a relationship among the exposure control values according to the present exemplary embodiment, the aperture value, accumulation time (shutter speed), and image capturing sensitivity in the above-described APEX system satisfy the following equation (1):

$$Bv=Av+Tv-Sv \qquad (1)$$

In the equation (1), Av indicates aperture value, Tv indicates accumulation time (shutter speed), Sv indicates image capturing sensitivity (for example, ISO sensitivity), and Bv indicates brightness.

In a lens unit not including the APD filter 202, the T number and the F number relating to the diaphragm are approximately identical as described above, the F number of the camera main body 100 is adjusted to the Av on the program line. However, if the lens unit 200 including the APD filter 202 is attached to the camera main body 100, the T value and the F value may not coincide with each other as described above. Therefore, in order to capture an image of the subject using the lens unit 200 including the APD filter 202, the Av on the program line is converted to the T number.

In the present exemplary embodiment, depending on the presence or absence of the APD filter 202, the aperture value (Av) for use in the exposure control is calculated with reference to the F number or is calculated with reference to the T number. In step S503, the camera control unit 101 determines whether the lens unit 200 attached to the camera main body 100 includes the APD filter 202. As for the determination in step S503, for example, with the lens unit 200 attached to the camera main body 100, the camera main body 100 receives lens type information (ID) and determines the presence or absence of the APD filter 202 based on the lens type information. Otherwise, the camera control unit 101 may determine the presence or absence of the APD filter 202 based on a sample image obtained with the diaphragm in the opening state. Any method may be used to determine the presence or absence of the APD filter 202.

If the camera control unit 101 determines that the lens unit 200 attached to the camera main body 100 does not include the APD filter 202 (NO in step S503), the process is terminated. If the camera control unit 101 determines that the lens unit 200 attached to the camera main body 100 includes the APD filter 202 (YES in step S503), the processing proceeds to step S504. In step S504, the camera control unit 101 converts the aperture value (T number) in the exposure control values determined in step S502 to the F number.

Details of the T number-to-F number conversion process executed in step S504 will be described with reference to FIG. 6. FIG. 6 is a flowchart of the T number-to-F number conversion process according to the exemplary embodiment of the disclosure.

First, in step S601, the camera control unit 101 reads information regarding conversion from the T number to the F number from the ROM of the lens control unit 203. With the lens unit 200 attached to the camera main body 100, the conversion information is transmitted from the lens unit 200 to the camera main body 100 via a communication terminal provided in the terminal group described above, and is recorded on the above-described storage unit 106 or the RAM.

The camera main body 100 may receive the conversion information from the lens unit 200 at any timing. In the present exemplary embodiment, the camera main body 100 receives the conversion information from the lens unit 200 through initial communication of the camera main body 100 at the time of power-on. Alternatively, the camera control unit 101 may read the conversion information as appropriate from a memory, not illustrated, provided in the lens unit 200, at the time of execution of step S601.

Next, in step S602, the camera control unit 101 determines whether a plurality of F numbers is associated with one T number, based on the acquired conversion information. As described above, the lens unit 200 in the present exemplary embodiment includes the APD filter 202 and thus the aperture diameter of the diaphragm 204 changes but the quantity of light transmitted through the diaphragm 204 does not change in some area. In this case, the F number, which is a parameter related to the aperture diameter of the diaphragm 204, changes but the quantity of light entering the camera main body 100 via the diaphragm 204 does not change, so there exists a plurality of F number with which the same light quantity is obtained, in association with one T number. In other words, a plurality of F numbers can be set for one T number. For example, the depth of field varies depending on the differences in the F number. Therefore, if there exists a plurality of F numbers at which approximately identical light quantities are obtained, even though the user intends to acquire an image with a shallow depth of field, setting an aperture value on the closing side may result in an image with an effect not intended by the user.

If the camera control unit 101 determines that a plurality of F numbers cannot be set for the T number (NO in step S602), there is one F number corresponding to the T number. Thus, the camera control unit 101 converts the parameter for the aperture value to the F number predetermined in association with the T number. Then, the F number conversion process is terminated.

If the camera control unit 101 determines that a plurality of F numbers can be set for the T number (YES in step S602), there exists a plurality of combinations of the corresponding T number and F number. Thus, the processing proceeds to step S604. In step S604, the camera control unit 101 converts the T number to an optimum F number.

In step S604, the camera control unit 101 detects information regarding the current image capturing conditions. The information regarding the image capturing conditions in the present exemplary embodiment refers to the recording mode (still image or moving image) and image capturing mode (landscape, group photo, or portrait), but the information is not limited to the modes. For example, the information regarding the image capturing conditions may be information regarding the method for an automatic focusing process (autofocus) on a subject or the method for outputting an image signal, instead of the information regarding the modes.

Next, in step S605, the camera control unit 101 determines whether the information regarding the image capturing conditions acquired in step S604 satisfies a predetermined condition. Specifically, in the present exemplary embodiment, in step S605, the camera control unit 101 determines whether the current recording mode is the still image mode or the moving image mode. If the camera control unit 101 determines that the recording mode is the still image mode (YES in step S605), the processing proceeds to step S606. If the camera control unit 101 determines that the recording mode is the moving image mode (NO in step S605), the processing proceeds to step S609.

Next, in step S606, the camera control unit 101 determines whether the current image capturing mode is the landscape mode or the group photo mode, based on the information regarding the image capturing conditions acquired in step S604. In the landscape mode or the group photo mode, it is to decrease the aperture diameter of the diaphragm to increase (deepen) the depth of field so that the subject within the angle of view is entirely in focus.

If the camera control unit 101 determines that the image capturing mode is the landscape mode or the group photo mode (YES in step S606), in step S607, the camera control unit 101 converts the T number to an F number with which the diaphragm 204 is on the closing side, among the plurality of F numbers corresponding to the T number. The specific image capturing mode determined in step S606 is not limited to the above-described mode. For example, the image capturing mode can be any image capturing mode as far as the aperture diameter of the diaphragm 204 is on the closing side in the image capturing mode. For example, the specific image capturing mode may be an image capturing mode suitable for imaging a starry sky.

If the camera control unit 101 determines that the image capturing mode is not the landscape mode or the group photo mode (NO in step S606), in step S608, the camera control unit 101 converts the T number to an F number with which the diaphragm 204 is on the opening side, among the plurality of F numbers corresponding to the T number. In a case where a plurality of F number is selectable, the maximum effect of the APD filter 202 is produced with the F number with which the diaphragm is on the opening side where the depth of field is small (shallow) and the amount of blur in the background is largest. Therefore, in the present exemplary embodiment, if a plurality of F numbers is selectable for the T number, the camera control unit 101 converts the T number to the F number on the opening side where the maximum effect of the APD filter 202 is produced, except in a case of imaging a subject the depth of field of which is to be intentionally increased (deepened). This configuration allows the outline of a blurred image of the subject to be smoothly represented, so it is possible to express a high-quality blur in an image obtained by imaging the subject.

Next, a process performed by the camera control unit 101 when determining in step S605 that the current image capturing mode is the moving image mode will be described. In step S609, the camera control unit 101 determines whether the current image capturing mode is a portrait mode suitable for imaging a person. In the portrait mode here, the aperture diameter of the diaphragm is increased to reduce (shallow) the depth of field so that the background of the person is smoothly blurred and the image of the person is enhanced.

Thus, if determining that the image capturing mode is the portrait mode (YES in step S609), in step S610, the camera control unit 101 converts the T value to an F number with which the diaphragm 204 is on the opening side, among the plurality of F numbers corresponding to the T number. The specific image capturing mode determined in step S609 is not limited to the above-described mode. For example, the image capturing mode can be any image capturing mode as far as the aperture diameter of the diaphragm 204 is on the opening side in the image capturing mode. For example, even in an image capturing mode where an animal such as a pet is the main subject, the above-described processing in step S610 may be performed to convert the T number to an F number on the opening side.

If determining that the image capturing mode is not the portrait mode (NO in step S609), in step S614, the camera control unit 101 converts the T number to an F number with which the diaphragm 204 is on the closing side, among the plurality of F numbers corresponding to the T number. Unless a moving image is captured with a specific subject such as a person, it is not desirable that the in-focus position or the degree of in-focus of the subject often changes in a moving image because the motion of the subject is continuously recorded in the moving image. As compared to capturing a still image, there is a high demand for recording as many pieces of information as possible that exist within the angle of view in the video in capturing a moving image. In one embodiment, the depth of field is increased (deepen) at the time of capturing a moving image in an image capturing mode other than the image capturing mode where a specific subject such as a person is the main subject.

Next, in step S611, the camera control unit 101 determines whether the F numbers selectable corresponding to the T number include an F number changed from the current F number by a predetermined or larger number of stages. The stage indicates the degree of change in exposure in accordance with the APEX system as described above. In the present exemplary embodiment, in step S611, the camera control unit 101 determines whether the selectable F numbers include an F number different from the current F number by 0.5 stages or more.

Next, in step S612, the camera control unit 101 clips (fixes) the number of stages in change of the F number that is changed by the predetermined or larger number of stages determined in step S611, to a predetermined value. In the present exemplary embodiment, this predetermined value is 0.3. In step S613, the camera control unit 101 adds the number of stages clipped in step S612 to the current (prior-change) F number to determine the F number for conversion.

The processing in steps S611 to S613 is intended to suppress a blur in a moving image from being changed unnaturally. As a video effect in a moving image, a time-series change in a blur greatly influences the quality of the moving image. In particular, in the case of using the APD filter 202, a time-series change in a blurred image becomes large relative to a small change in the light quantity in the area where the change ratio of the T number to the F number is small, thereby bringing about an unnatural change in the blurred image. Thus, executing the processing in steps S611 to S613 increases the change rate of the aperture diameter of the diaphragm. Accordingly, even in a case where a change in the blurred image is expected to be extremely large, the T number can be converted to an F number between the opening side and the closing side to suppress a sharp change in the F number. This configuration keeps the change rate of the aperture diameter of the diaphragm at a predetermined value or less in accordance with the change from the previously set F number, so that the aperture diameter of the diaphragm can be gradually changed to enable a smooth change in a blur in the moving image.

Aside from the conditions determined in steps S611 to S613 described above, various other conditions are applicable as conditions for converting the T number to an F number between the opening and closing sides of the diaphragm in accordance with the image capturing conditions. For example, if it is difficult to identify the image capturing target for the reason that a specific image capturing mode is not set or the like, an F number in about the midpoint between the opening side and the closing side among the selectable F numbers may be set as the F number to be converted from the T number. The foregoing is the T number-to-F number conversion process according to the present exemplary embodiment. Upon completion of this process, the exposure control value calculation process for imaging illustrated in FIG. 5 is terminated.

Returning to FIG. 4, in step S408, the camera control unit 101 determines whether an imaging instruction has been issued. In the present exemplary embodiment, the camera control unit 101 determines the presence or absence of an imaging instruction by determining whether the release switch of the operation unit 104 is in the fully pressed state (hereinafter, called SW2 state).

In the present exemplary embodiment, the camera control unit 101 repeats steps S401 to S408 until the release switch is fully pressed to issue an imaging instruction. If determining that the release switch has been fully pressed (YES in step S408), in step S409, the camera control unit 101 starts imaging the subject based on the predetermined exposure control values for imaging, and then terminates the exposure control process.

The flowchart in FIG. 4 particularly illustrates a process for exposure control at the time of capturing a still image. Thus, the exposure control for capturing a moving image is not limited to this process. For example, at the time of capturing a moving image, it is not necessary to determine the presence or absence of an imaging preparation instruction (shift to the SW1 state) for shifting to the photometric value calculation process for imaging, and a photometric calculation is repeated at predetermined time intervals during the live view display. Otherwise, regardless of the presence or absence of an imaging instruction (shift to the SW2 state), the recording of a moving image may be started, for example, in response to the operation of a dedicated member (not illustrated) for instructing the start of recording of a moving image.

As described above, in the present exemplary embodiment, even in a case where a plurality of F numbers is selectable for an arbitrary T number to capture an image of a subject via the APD filter, the optimum aperture diameter of the diaphragm can be set in accordance with the image capturing conditions. According to this configuration, it is possible to prevent a user from ending up with an image with an effect not intended by the user due to the difference in the aperture diameter.

Some exemplary embodiments of the disclosure have been described. However, the disclosure is not limited to these exemplary embodiments but can be modified and changed in various manners within the scope of its gist. For example, in the above-described 5 exemplary embodiments, the camera main body 100 is a lens-exchangeable imaging apparatus to which the lens unit 200 is detachably attached. However, the aspect of the embodiments is not limited to this. For example, the camera main body 100 may be a lens-integrated imaging apparatus with the lens unit 200 built in. In this case, if the lens unit 200 includes the APD filter 202, the T number-to-F number conversion process described above can be executed to set the optimum F number (that is, the aperture diameter of the diaphragm) in accordance with the image capturing conditions.

In the above-described exemplary embodiments, for example, the lens unit 200 includes the APD filter 202. However, the aspect of the embodiments is not limited to this configuration. For example, a lens adapter detachably attached to the camera main body 100 may internally include an APD filter. In this case, the lens adapter has a first side (for example, a first mount portion) on which the lens adapter is detachably attached to the camera main body 100 and a second side (for example, a second mount portion) to which the lens unit including the diaphragm 204 is detachably attached, which are opposed to each other in the direction of the optical axis. The lens adapter includes the above-described terminal group, and the camera main body 100 reads the T number-to-F number conversion information from the lens adapter or from the lens unit via the lens adapter.

In the above-described exemplary embodiments, the APD filter 202 is used to change the light transmittance in the radial direction with respect to the optical axis. However, the aspect of the embodiments is not limited to this configuration. The above-described exemplary embodiments are also applicable to a structure in which an optical member other than the APD filter 202 is used, as far as the light transmittance is changeable in the radial direction with respect to the optical axis.

In the above-described exemplary embodiments, the T number-to-F number conversion information is read from the outside of the camera main body 100. However, the aspect of the embodiments is not limited to this. For example, the T number-to-F number conversion information may be stored in the ROM of the camera main body 100.

In the above-described exemplary embodiments, the individual units constituting the imaging system centered on the camera control unit 101 operate in cooperation with one another to control the operation of the entire apparatus, but the disclosure is not limited to this configuration. For example, some (computer) programs in accordance with the above-described process flows illustrated in the drawings may be stored in advance in the ROM or the like of the camera main body 100. Then, the programs may be executed by a microprocessor such as the camera control unit 101 to control the operation of the entire image capturing system. The programs may be in any form, such as object codes, programs to be executed by an interpreter, or script data to be supplied to the OS, as far as they serve the function of programs. The recording medium for supplying the programs may be a hard disc, a magnetic recording medium such as a magnetic tape, or an optical/magnetooptical recording medium.

In the above-described exemplary embodiments, a digital camera is taken as an example of the imaging apparatus carrying out the disclosure, but the disclosure is not limited to this. For example, any of various imaging apparatuses may be adopted, including mobile devices such as digital video cameras and smartphones, wearable terminals, and security cameras.

Other Exemplary Embodiments

The aspect of the embodiments can be implemented by supplying programs implementing one or more functions in the above-described exemplary embodiments to a system or an apparatus, and reading and executing the programs by one or more processors of a computer in the system or apparatus. Alternatively, the aspect of the embodiments can be implemented by a circuit implementing one or more functions (for example, application specific integrated circuit (ASIC)).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-115380, filed Jul. 3, 2020, which is hereby incorporated by reference herein in its entirety.

What is claimed is:

1. An apparatus that includes an imaging unit and is capable of controlling an aperture diameter of a diaphragm for adjusting quantity of light entering the imaging unit, the apparatus comprising:
   at least one processor; and
   a memory coupled to the processor storing instructions that, when executed by the processor, cause the processor to function as:
   a photometry unit;
   a control unit configured to control a plurality of control values including the aperture diameter of the diaphragm, based on a result of photometry using the photometry unit;
   a first determination unit configured to determine whether light flux entering the imaging unit enters via a predetermined optical member; and
   a second determination unit configured to determine, in a case where the light flux enters the imaging unit via the predetermined optical member, whether there exists a plurality of F numbers that indicates the aperture diameter of the diaphragm at which approximately identical quantities of light enter the imaging unit,
   wherein the predetermined optical member has light transmitted in quantities varying stepwise in a radial direction with respect to an optical axis, and
   wherein, in a case where there exists a plurality of F numbers at which approximately identical quantities of light enter the imaging unit, the control unit controls the F number to be differently set in accordance with information regarding a condition.

2. The apparatus according to claim 1, comprising a calculation unit configured to calculate a T number indicating the aperture diameter and light transmittance of the diaphragm, based on the result of photometry by the photometry unit,
   wherein the second determination unit determines whether there exists a plurality of F numbers at which approximately identical quantities of light enter the imaging unit, for the calculated T number.

3. The apparatus according to claim 2, wherein the second determination unit determines whether there exists a plurality of F numbers at which approximately identical quantities of light enter the imaging unit for an arbitrary T number, based on T number-to-F number conversion information.

4. The apparatus according to claim 3,
   wherein a lens unit including the diaphragm and the predetermined optical member is detachably attached to the apparatus, and
   wherein the T number-to-F number conversion information is readable from the lens unit by the apparatus.

5. The apparatus according to claim 4, wherein the predetermined optical member is an apodization filter.

6. The apparatus according to claim 3,
   wherein an adapter including the predetermined optical member is detachably attached to the apparatus,
   wherein a lens unit including the diaphragm is detachably attached to the adapter, and
   wherein the T number-to-F number conversion information is readable from the adapter by the apparatus.

7. The apparatus according to claim 3, comprising the predetermined optical member and the diaphragm.

8. The apparatus according to claim 1, wherein, in a case where there exists a plurality of F numbers at which approximately identical quantities of light enter the imaging unit, and, based on the information regarding the condition, the control unit controls the F number to be set on an opening side under a condition under which a predetermined subject exists the depth of field of which is shallowed within an angle of view.

9. The apparatus according to claim 1, wherein, in a case where there exists a plurality of F numbers at which approximately identical quantities of light enter the imaging unit, and, based on the information regarding the condition, the control unit controls the F number to be set on a closing side under a condition under which a predetermined subject exists the depth of field of which is deepened within an angle of view.

10. The apparatus according to claim 1,
    wherein the information regarding the condition is information regarding an image capturing mode, and
    wherein, in a case where there exists a plurality of F numbers at which approximately identical quantities of light enter the imaging unit, and, in a case where the image capturing mode is a portrait mode, the control unit sets the F number on the opening side.

11. The apparatus according to claim 1,
    wherein the information regarding the condition is information regarding an image capturing mode, and
    wherein, in a case where there exists a plurality of F numbers at which approximately identical quantities of light enter the imaging unit, and, in a case where the image capturing mode is a landscape mode, the control unit sets the F number on the closing side.

12. The apparatus according to claim 1,
    wherein the predetermined optical member includes a first area where the quantity of light transmitted varies stepwise and a second area where the quantity of light transmitted is approximately identical, in the radial direction with respect to the optical axis, and
    wherein, in a case where the light flux enters the imaging unit via the first area of the predetermined optical member, the second determination unit determines that there exists a plurality of F numbers at which approximately identical quantities of light enter the imaging unit.

13. The apparatus according to claim 1, wherein if a moving image is captured and the second determination unit determines that there exists a plurality of F numbers at which approximately identical quantities of light enter the imaging unit, the control unit newly sets an F number such that the rate of change in the aperture diameter of the diaphragm to the previously set F number takes on a predetermined value or less, based on the information regarding the condition.

14. A method of an apparatus that includes an imaging unit and is capable of controlling an aperture diameter of a diaphragm for adjusting quantity of light entering the imaging unit, the method comprising:
  performing photometry;
  performing control for controlling a plurality of control values including the aperture diameter of the diaphragm, based on a result of the photometry;
  determining, as a first determining, whether light flux entering the imaging unit enters via a predetermined optical member; and
  determining, as a second determining, whether there exists a plurality of F numbers that indicates the aperture diameter of the diaphragm at which approximately identical quantities of light enter the imaging unit, in a case where it is determined in the first determining that the light flux enters the imaging unit via the predetermined optical member,
  wherein the predetermined optical member has light transmitted in quantities varying stepwise in a radial direction with respect to an optical axis, and
  wherein, in a case where there exists a plurality of F numbers at which approximately identical quantities of light enter the imaging unit, the performing control is performed such that the F number is controlled to be differently set in accordance with information regarding a condition.

15. The method according to claim 14, further comprising calculating a T number indicating the aperture diameter and light transmittance of the diaphragm, based on the result of photometry by the performing photometry,
  wherein the determining, as the second determining, determines whether there exists a plurality of F numbers at which approximately identical quantities of light enter the imaging unit, for the calculated T number.

16. The method according to claim 14, wherein, in a case where there exists a plurality of F numbers at which approximately identical quantities of light enter the imaging unit, and, based on the information regarding the condition, the performing control controls the F number to be set on an opening side or closing side and under a condition under which a predetermined subject exists the depth of field of which is shallowed or deepened, respectfully, within an angle of view.

17. A non-transitory computer readable medium that stores a program, wherein the program causes a computer to execute a method of an apparatus that includes an imaging unit and is capable of controlling an aperture diameter of a diaphragm for adjusting quantity of light entering the imaging unit, the method comprising:
  performing photometry;
  performing control for controlling a plurality of control values including the aperture diameter of the diaphragm, based on a result of the photometry;
  determining, as a first determining, whether light flux entering the imaging unit enters via a predetermined optical member; and
  determining, as a second determining, whether there exists a plurality of F numbers that indicates the aperture diameter of the diaphragm at which approximately identical quantities of light enter the imaging unit, in a case where it is determined in the first determining that the light flux enters the imaging unit via the predetermined optical member,
  wherein the predetermined optical member has light transmitted in quantities varying stepwise in a radial direction with respect to an optical axis, and
  wherein, in a case where there exists a plurality of F numbers at which approximately identical quantities of light enter the imaging unit, the performing control is performed such that the F number is controlled to be differently set in accordance with information regarding a condition.

18. The non-transitory computer readable medium according to claim 17, further comprising calculating a T number indicating the aperture diameter and light transmittance of the diaphragm, based on the result of photometry by the performing photometry,
  wherein the determining, as the second determining, determines whether there exists a plurality of F numbers at which approximately identical quantities of light enter the imaging unit, for the calculated T number.

19. The non-transitory computer readable medium according to claim 17, wherein, in a case where there exists a plurality of F numbers at which approximately identical quantities of light enter the imaging unit, and, based on the information regarding the condition, the performing control controls the F number to be set on an opening side or closing side and under a condition under which a predetermined subject exists the depth of field of which is shallowed or deepened, respectfully, within an angle of view.

* * * * *